Nov. 10, 1953     H. L. SEVERANCE     2,658,502
COMBINATION WATER AND ROOM HEATER
Filed Sept. 13, 1949
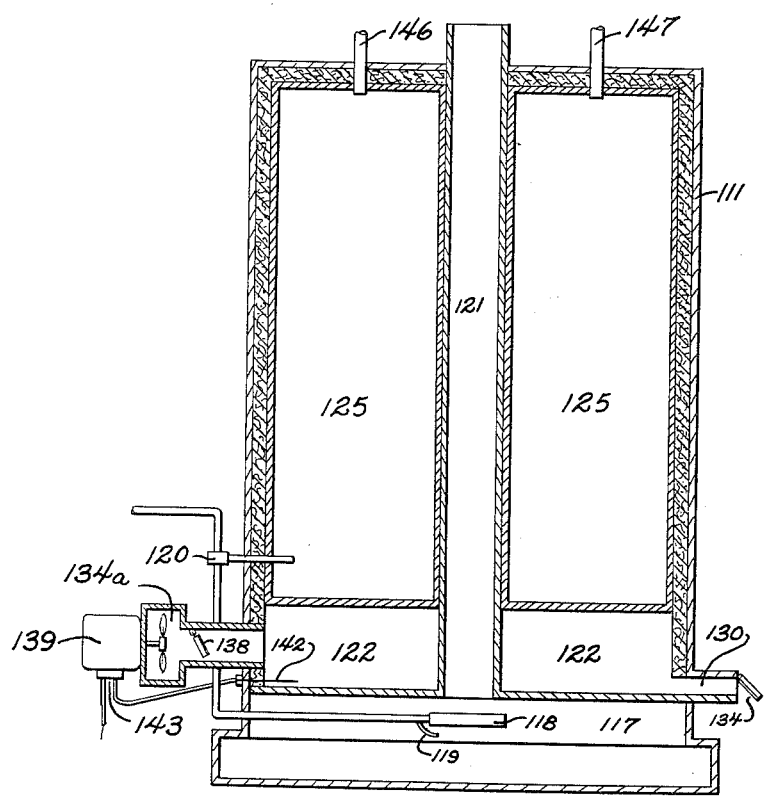
INVENTOR
HARLEY L. SEVERANCE
BY Joseph G. Werner
ATTORNEY

Patented Nov. 10, 1953

2,658,502

UNITED STATES PATENT OFFICE 2,658,502

COMBINATION WATER AND ROOM HEATER

Harley L. Severance, Madison, Wis.

Application September 13, 1949, Serial No. 115,458

1 Claim. (Cl. 126—101)

This invention relates to improvements in combination water and room heaters.

It is recognized that there is a need for a heater contained in a single unit which will economically and efficiently heat and maintain heat in a relatively large quantity of water and at the same time provide heat for the room or building in which the heater is situated. Such a heater is particularly useful in tourist cabins, farm milk houses, and other buildings where heat and hot water are required and where it is impractical or too costly to maintain central heat and hot water systems.

It is an object of the present invention to provide a combination water and room heater which utilizes the direct heat from the burner or other means of heating to heat the air of the room or building without materially interfering with the heating of the water and without materially interfering with the retention of heat in the water.

It is another object of the invention to provide a combination water and room heater which promptly emits hot air into the room or building upon ignition of the fuel, such hot air having a temperature considerably higher than the temperature of the water contained in the heater, and which emits such heat without regard to the temperature of such water.

Another object is to provide a device of the above character in which there is a minimum of condensation on the inner side of the water tank.

A further object is to provide a combination water and room heater which, when the room heating device is not in operation, will retain the heat in the water for a period of time greater than that normally found in conventional hot water heaters.

It is a further object of the invention to provide a combination water and room heater using gas, fuel oil, coal, or other fuel which may be constructed at a relatively low cost and operated efficiently and economically.

Other objects and advantages of the invention will be apparent from the following detailed description taken in conjunction with the accompanying drawings wherein a preferred embodiment of the principles of the invention has been selected for exemplification.

The figure in the drawing is a vertical sectional view of a combination air and hot water heater constructed in accordance with the invention.

Referring more particularly to the drawing, the device, as shown, comprises, an outer housing or jacket 111 supported upon a base having a combustion chamber 117 containing a conventional fluid fuel burner 118 with pilot light attachment 119 the operation of which may be controlled by any suitable thermostatic device as shown at 120. A centrally disposed flue 121, preferably in the form of a relatively narrow elongated tube of uniform diameter, extends vertically upwardly of the burner 118 to provide a discharge passageway for hot products of combustion.

An upright tank indicated in its entirety at 125 and having a cold water inlet 146 and a hot water outlet 147 is disposed within the jacket 111, the adjacent walls being spaced for the reception of any suitable insulating material. As shown, the flue 121 extends centrally upwardly through the water container 125 and is in direct heat exchange relation therewith whereby to provide for the direct transfer of heat from the hot products of combustion to the water container.

The water container 125 includes, as shown, a substantially horizontal transverse bottom wall extending annularly of the flue 121 and between the flue and the inner wall of the housing or jacket 111. A lower substantially horizontal transverse wall is also disposed in the housing 111 beneath and coextensive with the aforesaid container bottom wall whereby the two transverse walls form an air heating chamber 122 coextensive with the container bottom wall and surrounding the lower extremity of the flue 121 in direct heat exchange relation therewith. The air heating chamber 122, thus, is disposed immediately above and in direct heat exchange relation with the combustion chamber 117.

Air heating chamber 122 is provided with a hot air outlet 130 having a hinged insulated closure or door 134 which may be weighted or biased to closed position so as to open outwardly when there is a circulation of air in the heating chamber 122. The cool air inlet 134a at the opposed portion of the chamber may also include a hinged insulated closure or door 138 which may be weighted or biased to closed position in such a manner as to open inwardly when air is blown into the air inlet 134a by the motor driven electric fan 139 or other forced draft means located at the mouth of the inlet. A thermostatic control element 142 to regulate operation of the fan is extended into the hot air chamber 122 and such control element and the fan are electrically connected to a switch box 143.

While the drawing illustrates a heater using gas for fuel, the device may be used satisfactorily with fuel oil, coal or other types of fuel. The invention may also be used satisfactorily where the supply of fuel to the burner or the amount of heat is not thermostatically controlled.

The operation of the invention as herein illustrated and described is believed to be readily apparent. For example, referring to the figure in the drawing, when the burner 118 is in operation, the air in air heating chamber 122 is heated, thereby activating thermostatic control element 142 which turns on the fan 139. The hinged door 138 opens inwardly from the force of the air created by the fan 139 and the cool or fresh air from the room is forced by the fan through the inlet 134a into the chamber 122 wherein the air is heated by the lower extremity of the flue 121 and the combustion chamber 117 which are, respectively, in direct heat exchange relation with the air heating chamber. As the air is then forced through the air outlet 130 the hinged door 134 is raised and the heated air escapes into the room or building. Simultaneously, the water in container 125 is being heated and when the desired temperature is reached the flame of the thermostatically controlled burner 118 is extinguished and the air in the hot air chamber 122 cools, thereby activating the thermostatic control element 142 so as to stop the fan 139. The hinged doors 138 and 134 close when the fan ceases operating and the warm air remains in the chamber in turn to maintain the water in the tank 125 at a warm temperature. In a heater equipped with a pilot light 119 the warm air created by such pilot light ascends in the flue 121 and radiates heat in the hot air chamber 122 and the water tank 125 thereby preventing any extensive condensation of the water.

If it is desired to furnish additional heat to the area surrounding the heater after the water has reached the desired temperature, the fan may be continued in operation by means of a conventional dual switch control and the air warmed in the chamber 122 by contact with the bottom wall of the tank 125 will be forced through the outlet 130 into the room or building. During warm seasons of the year or when the air of the room is sufficiently warm, the fan may be disconnected or turned off by a switch and no warm air will escape into the room as hinged insulated doors 138 and 134 will be closed.

It will be understood that the invention is not confined to the precise construction and arrangement of parts as herein described and illustrated, but is intended to embrace all modifications thereof as come within the scope of the following claim.

I claim:

An air and hot water heater comprising, an insulated housing, an upright container for water disposed within and adjoining the inner wall of said housing, a vertically disposed flue in the form of a narrow elongated tube of uniform diameter extending centrally upward through said water container and in direct heat exchange relation therewith, the said flue forming a passageway for hot products of combustion whereby to provide direct transfer of heat to said water container, the said container having a substantially horizontal transverse bottom wall extending annularly of said flue and between said flue and the inner wall of said housing, a lower substantially horizontal transverse wall in said housing disposed beneath and coextensive with said container bottom wall, the said lower transverse wall and container bottom wall forming an air heating chamber coextensive with said container bottom wall and surrounding said flue and in direct heat exchange relation with the lower extremity of said flue, air inlet and outlet means for said air heating chamber, the lower portion of said housing forming with said lower transverse wall a combustion chamber in communication with the lower extremity of said flue and in direct heat exchange relation with said air heating chamber, and a fluid fuel burner in said combustion chamber.

HARLEY L. SEVERANCE.

References Cited in the file of this patent

UNITED STATES PATENTS

| Number | Name | Date |
|---|---|---|
| Re. 19,363 | Ott et al. | Nov. 6, 1934 |
| 966,064 | Wallace | Aug. 2, 1910 |
| 1,270,877 | Schulz | July 2, 1918 |
| 1,558,848 | Doble | Oct. 27, 1925 |
| 1,621,013 | Hodges et al. | Mar. 15, 1927 |
| 2,023,602 | Lithman | Dec. 10, 1935 |
| 2,065,251 | Sweeley et al. | Dec. 22, 1936 |
| 2,126,969 | Morrow | Aug. 16, 1938 |
| 2,225,023 | Watt | Dec. 17, 1940 |
| 2,268,789 | Watt | Jan. 6, 1942 |
| 2,529,977 | Thomas | Nov. 14, 1950 |